(12) United States Patent
Irie

(10) Patent No.: US 8,009,517 B2
(45) Date of Patent: Aug. 30, 2011

(54) WIRELESS COMMUNICATION SYSTEM, TRANSMITTING DEVICE, RECEIVING DEVICE AND INFORMATION PROCESSING APPARATUS

(75) Inventor: Michio Irie, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 417 days.

(21) Appl. No.: 12/372,318

(22) Filed: Feb. 17, 2009

(65) Prior Publication Data

US 2009/0213697 A1 Aug. 27, 2009

(30) Foreign Application Priority Data

Feb. 21, 2008 (JP) ................................. 2008-039766
Nov. 28, 2008 (JP) ................................. 2008-303760

(51) Int. Cl.
*H04B 11/00* (2006.01)
*G10K 11/00* (2006.01)

(52) U.S. Cl. ........ 367/134; 367/131; 367/140; 367/141; 367/157; 367/132; 405/185; 405/186; 405/189

(58) Field of Classification Search .................. 367/131, 367/132, 134, 140, 141, 157; 405/185, 186, 405/189
See application file for complete search history.

(56) References Cited

U.S. PATENT DOCUMENTS

| | | | | |
|---|---|---|---|---|
| 3,846,778 A * | 11/1974 | Galvin et al. | ................. | 340/522 |
| 4,235,113 A * | 11/1980 | Carome | ......................... | 73/655 |
| 4,336,537 A * | 6/1982 | Strickland | ..................... | 340/850 |
| 4,375,680 A * | 3/1983 | Cahill et al. | .................. | 367/149 |
| 5,136,555 A * | 8/1992 | Gardos | ......................... | 367/132 |
| 5,504,477 A * | 4/1996 | Whitright et al. | ............ | 340/10.4 |
| 5,523,982 A * | 6/1996 | Dale | .............................. | 367/131 |
| 5,586,176 A * | 12/1996 | Peck | .............................. | 379/175 |
| 5,636,182 A * | 6/1997 | Suzuki et al. | .................. | 367/165 |
| 5,784,339 A * | 7/1998 | Woodsum et al. | ............ | 367/134 |
| 5,956,291 A * | 9/1999 | Nehemiah et al. | ............. | 367/131 |
| 5,982,297 A * | 11/1999 | Welle | ........................ | 340/870.16 |
| 6,125,080 A * | 9/2000 | Sonnenschein et al. | ....... | 367/134 |
| 6,130,859 A * | 10/2000 | Sonnenschein et al. | ....... | 367/134 |
| 6,272,072 B1 * | 8/2001 | Wulich et al. | ................. | 367/124 |
| 6,272,073 B1 * | 8/2001 | Doucette et al. | .............. | 367/131 |
| 6,762,678 B2 * | 7/2004 | Arens | ........................... | 340/506 |
| 6,961,555 B1 * | 11/2005 | Philyaw | ........................ | 455/403 |
| 7,144,198 B2 * | 12/2006 | Hirose et al. | .................. | 405/186 |
| 2002/0176323 A1 * | 11/2002 | Magine et al. | ................. | 367/134 |
| 2003/0053643 A1 * | 3/2003 | Bank et al. | ..................... | 381/152 |

FOREIGN PATENT DOCUMENTS

| | | |
|---|---|---|
| JP | A-11-105787 | 4/1999 |
| JP | 2000266730 A * | 9/2000 |
| JP | A-2001-278192 | 10/2001 |
| JP | A-2003-77087 | 3/2003 |
| JP | A-2004-10027 | 1/2004 |
| JP | 2005292044 A * | 10/2005 |

* cited by examiner

*Primary Examiner* — Thomas Tarcza
*Assistant Examiner* — James Hulka
(74) *Attorney, Agent, or Firm* — Oliff & Berridge PLC

(57) ABSTRACT

A wireless communication system includes a transmitting device and a receiving device, in which the transmitting device generates a signal including information and transmits the signal by electromagnetic waves and ultrasonic waves in the same frequency in parallel, and in which the receiving device extracts the signal from at least one of the electromagnetic waves and the ultrasonic waves transmitted from the transmitting device and acquires the information included in the extracted signal.

7 Claims, 6 Drawing Sheets

WIRELESS COMMUNICATION SYSTEM, TRANSMITTING DEVICE, RECEIVING DEVICE AND INFORMATION PROCESSING APPARATUS

Japanese Patent Application No. 2008-39766 filed on Feb. 21, 2008, No. 2008-303760 filed on Nov. 28, 2008, are hereby incorporated by reference in its entirety.

BACKGROUND

1. Technical Field

The present invention relates to a wireless communication system, a transmitting device, a receiving device and an information processing apparatus which are usable in water.

2. Related Art

A diver during diving secures safety by performing communication with other divers or base stations on land and on ships to exchange information and to grasp the remaining amount of air of an air tank used by himself/herself. As an apparatus for communicating with the outside or for grasping the remaining amount of air, an information processing apparatus for divers as shown in JP-A-2001-278192 is proposed. In the information processing apparatus for divers, an in-water sensing switch which is conducted by sea water determines whether during diving or not-during diving, and communication is performed by switching a medium to be used such that ultrasonic waves are used as a medium for carrying a signal at the time of communication during diving, and electromagnetic waves are used as a medium for carrying a signal at the time of communication during not diving.

However, the disclosed information processing apparatus for divers requires the switch for determining whether during diving or not during diving and functions for transmission and reception in electromagnetic waves and ultrasonic waves respectively, therefore, it was difficult to realize miniaturization, weight saving and cost reduction of the apparatus.

SUMMARY

An advantage of some aspects of the invention is to solve at least a part of the problems described above and the invention can be realized as the following aspects or application examples.

APPLICATION EXAMPLE 1

A wireless communication system according to the application example is a wireless communication system including a transmitting device and a receiving device, in which the transmitting device generates a signal including information and transmits the signal by electromagnetic waves and ultrasonic waves in the same frequency in parallel, and in which the receiving device extracts the signal from at least one of the electromagnetic waves and the ultrasonic waves transmitted from the transmitting device and acquires the information included in the extracted signal.

According to the configuration, a mechanism for switching between electromagnetic waves and ultrasonic waves is not necessary in the transmitting device and the receiving device because electromagnetic waves and ultrasonic waves are used in parallel as media carrying the signal to be transmitted and received, and signals concerning the frequency can be processed in common in the transmitting device and the receiving device because the electromagnetic waves and the ultrasonic waves have the same frequency. As a result, miniaturization, weight saving and cost reduction of the transmitting device and the receiving device can be realized.

APPLICATION EXAMPLE 2

In the wireless communication system according to the above application example, it is preferable that the transmitting device divides the generated signal into a first signal and a second signal, transmitting the first signal by the electromagnetic waves, and transmitting the second signal by the ultrasonic waves, and that the receiving device combines the first signal transmitted by the electromagnetic waves with the second signal transmitted by the ultrasonic waves to acquire the information included in the combined signal.

According to the above configuration, the transmitting device and the receiving device can use at least one part for performing transmission and reception by electromagnetic waves and ultrasonic waves in common, therefore, miniaturization, weight saving and cost reduction of the transmitting device and the receiving device can be further realized.

APPLICATION EXAMPLE 3

A wireless communication system according to the application example is a wireless communication system including a transmitting device and a receiving device, in which the transmitting device has an input portion generating an input signal based on information to be inputted, a modulation portion generating a modulation signal by performing a prescribed modulation to the input signal, a transmitting portion generating a high-frequency signal having a prescribed frequency by amplifying the modulation signal, a dividing portion dividing the high-frequency signal into a first signal and a second signal, an antenna portion converting the first divided high-frequency signals into electromagnetic waves having the prescribed frequency and radiating the electromagnetic waves and a piezoelectric element portion converting the second divided high-frequency signals into ultrasonic waves having the prescribed frequency and radiating the ultrasonic waves, and in which the receiving device has an antenna portion receiving electromagnetic waves having the prescribed frequency and converting the waves into a high-frequency signal 1, a piezoelectric element portion receiving ultrasonic waves having the prescribed frequency and converting the waves into a high-frequency signal 2, a combining portion combining the high-frequency signal 1 with the high-frequency signal 2 to generate a combined signal, a receiving portion extracting a modulation signal from the combined signal, a demodulation portion demodulating the extracted modulation signal to acquire the input signal, and an output portion outputting the information included in the acquired input signal.

According to the above configuration, a mechanism for switching between electromagnetic waves and ultrasonic waves is not necessary in the transmitting device and the receiving device because electromagnetic waves and ultrasonic waves are used in parallel as media carrying the signal to be transmitted and received, and signals concerning the frequency can be processed in common in the transmitting device and the receiving device because the electromagnetic waves and the ultrasonic waves have the same frequency. As a result, miniaturization, weight saving and cost reduction of the transmitting device and the receiving device can be realized.

APPLICATION EXAMPLE 4

In the wireless communication system according to the above application example, it is preferable that a matching portion which matches impedances is provided at least one of between the dividing portion and the antenna portion, between the dividing portion and the piezoelectric element portion, between the combining portion and the antenna portion and between the combining portion and the piezoelectric element portion.

According to the above configuration, it is possible to match impedances and to improve isolation between the antenna portion and the piezoelectric element portion by providing the matching portion.

APPLICATION EXAMPLE 5

In the wireless communication system according to the above application example, it is preferable that at least one pair of the antenna portion and the piezoelectric element portion in the transmitting device and the receiving device is housed in a first casing which is waterproofed.

APPLICATION EXAMPLE 6

In the wireless communication system according to the above application example, it is preferable that the first casing is connected to a second casing which houses at least one of the transmitting device and the receiving device.

APPLICATION EXAMPLE 7

A transmitting device according to the application example includes an input portion generating an input signal based on information to be inputted, a modulation portion generating a modulation signal by performing a prescribed modulation to the input signal, a transmitting portion generating a high-frequency signal by amplifying the modulation signal, a dividing portion dividing the high-frequency signal into a first signal and a second signal, an antenna portion converting the first divided high-frequency signals into electromagnetic waves having the prescribed frequency and radiating the electromagnetic wave and a piezoelectric element portion converting the second divided high-frequency signals into ultrasonic waves having the prescribed frequency and radiating the ultrasonic waves.

According to the above configuration, a mechanism for switching between electromagnetic waves and ultrasonic waves is not necessary in the transmitting device because electromagnetic waves and ultrasonic waves are used in parallel as media carrying the signal to be transmitted, and signals concerning the frequency can be processed in common in the transmitting device because the electromagnetic waves and the ultrasonic waves have the same frequency. As a result, miniaturization, weight saving and cost reduction of the transmitting device can be realized.

APPLICATION EXAMPLE 8

A transmitting device according to the application example includes an input portion generating an input signal based on information to be inputted, a modulation portion generating a modulation signal by performing a prescribed modulation to the input signal, a dividing portion dividing the modulation signal into a first signal and a second signal, an electromagnetic waves transmitting portion generating a high-frequency signal 1 by amplifying the first divided modulation signals, an ultrasonic-waves transmitting portion generating a high-frequency signal 2 by amplifying the second divided modulation signal, an antenna portion converting the high-frequency signal 1 into electromagnetic waves having a prescribed frequency and radiating the electromagnetic waves and a piezoelectric element portion converting the high-frequency signal 2 into ultrasonic waves having the prescribed frequency and radiating the ultrasonic waves.

According to the above configuration, a mechanism for switching between electromagnetic waves and ultrasonic waves is not necessary in the transmitting device because electromagnetic waves and ultrasonic waves are used in parallel as media carrying the signal to be transmitted, and signals concerning the frequency can be processed in common in the transmitting device because the electromagnetic waves and the ultrasonic waves have the same frequency. As a result, miniaturization, weight saving and cost reduction of the transmitting device can be realized.

APPLICATION EXAMPLE 9

A receiving device according the application example includes an antenna portion receiving electromagnetic waves of electromagnetic waves and ultrasonic waves transmitted at the same frequency, which have been obtained by modulating an input signal generated based on information to be inputted, and converting the electromagnetic waves into a high-frequency signal 1, a piezoelectric element portion receiving the ultrasonic waves and converting the waves into a high-frequency signal 2, a combining portion combining the high-frequency signal 1 with the high-frequency signal 2 to generate a combined signal, a receiving portion extracting a modulation signal from the combined signal, a demodulation portion demodulating the extracted modulation signal to acquire the input signal, and an output portion outputting the information included in the acquired input signal.

According to the above configuration, a mechanism for switching between electromagnetic waves and ultrasonic waves is not necessary in the receiving device because electromagnetic waves and ultrasonic waves are used in parallel as media carrying the signal to be received, and signals concerning the frequency can be processed in common in the receiving device because the electromagnetic waves and the ultrasonic waves have the same frequency. As a result, miniaturization, weight saving and cost reduction of the receiving device can be realized.

APPLICATION EXAMPLE 10

A receiving device according to the application example includes an antenna portion receiving electromagnetic waves of electromagnetic waves and ultrasonic waves transmitted by the same frequency, which have been obtained by modulating an input signal generated based on information to be inputted, and converting the electromagnetic waves into a high-frequency signal 1, a piezoelectric element portion receiving the ultrasonic waves and converting the waves into a high-frequency signal 2, an electromagnetic-waves receiving portion extracting a modulation signal 1 from the high-frequency signal 1, an ultrasonic-waves receiving portion extracting a modulation signal 2 from the high-frequency signal 2, a combining portion combining the modulation signal 1 with the modulation signal 2 to generate a combined modulation signal, a demodulation portion demodulating the combined modulation signal to acquire the input signal and an output portion outputting information included in the acquired input signal.

According to the configuration, a mechanism for switching between electromagnetic waves and ultrasonic waves is not necessary in the receiving device because electromagnetic waves and ultrasonic waves are used in parallel as media carrying the signal to be received, and signals concerning the frequency can be processed in common in the receiving device because the electromagnetic waves and the ultrasonic waves have the same frequency. As a result, miniaturization, weight saving and cost reduction of the receiving device can be realized.

At least one of the above transmitting device and the receiving device is applied to the information processing apparatus, thereby realizing miniaturization, weight saving and cost reduction of the information processing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a wireless communication system usable in water will be explained with reference to the drawings.

Embodiment 1

Figure 1:
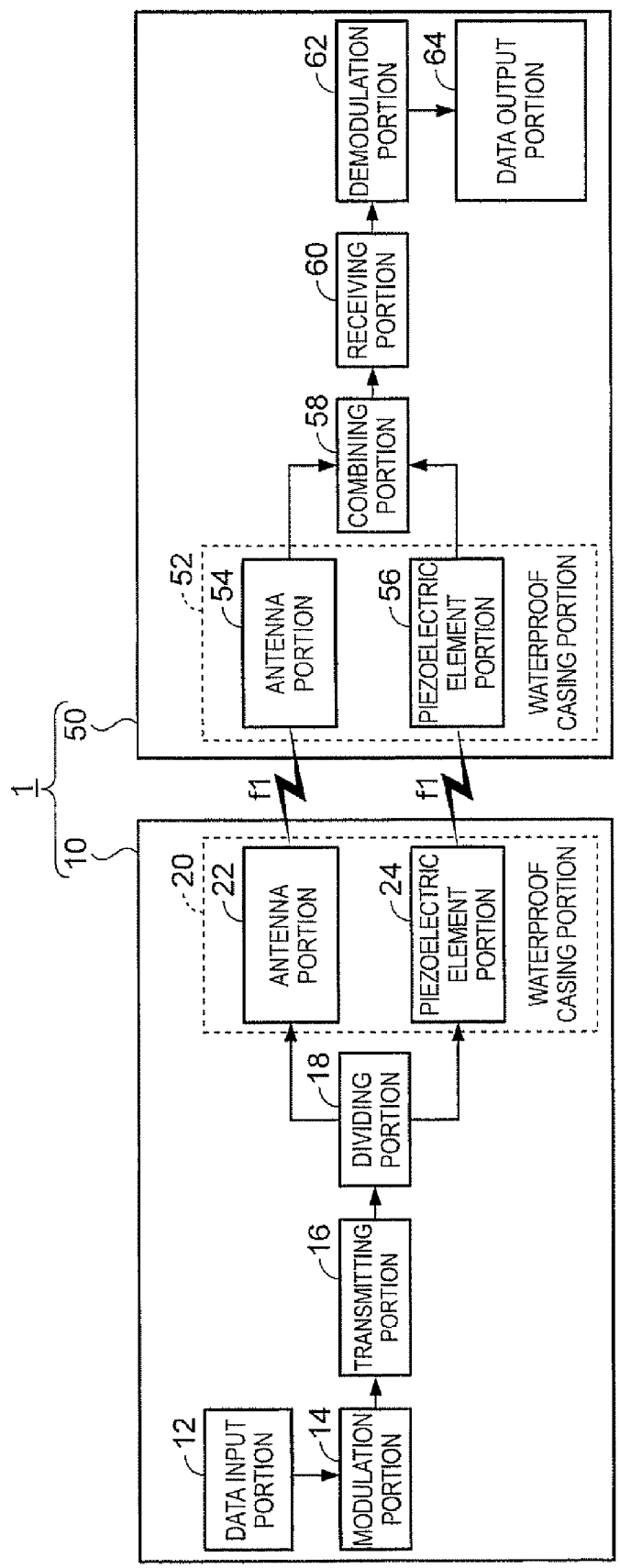
FIG. 1 is a block diagram showing a functional configuration of a wireless communication system according to Embodiment 1.
Figure 2:
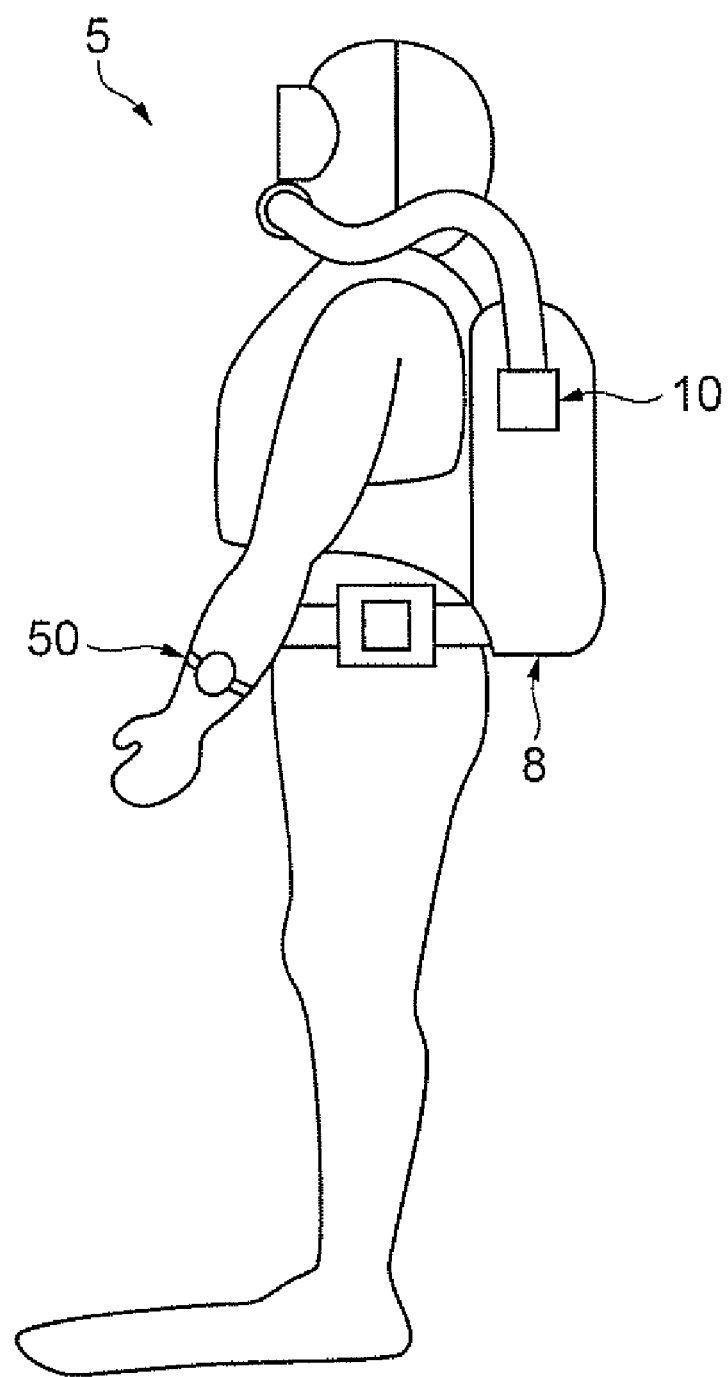
FIG. 2 is a view showing an example of using the wireless communication system according to Embodiment 1.

FIG. 1 is a block diagram showing a functional configuration of a wireless communication system 1 according to Embodiment 1. The wireless communication system 1 includes a wireless transmitting device 10 and a wireless receiving device 50. The wireless communication system 1 also includes functions of transmitting a signal including information by media of ultrasonic waves and electromagnetic waves having the same frequency in parallel, extracting the signal from at least one of the two media when receiving the transmitted two media respectively, and acquiring information included in the extracted signal. In Embodiment 1, the wireless communication system 1 is applied to an intended use in which information concerning the remaining amount of air of an air tank 8 on the back of a diver 5 is notified by wireless from the wireless transmitting device 10 installed at the air tank 8 to the wireless receiving device 50 worn by the diver 5 as shown in FIG. 2 which shows an example of using the wireless communication system according to Embodiment 1.

The wireless transmitting device 10 will be explained first. The wireless transmitting device 10 includes a data input portion 12, a modulation portion 14, a transmitting portion 16, a dividing portion 18, an antenna portion 22 and a piezoelectric element portion 24.

Data to be transmitted is inputted to the data input portion 12. In Embodiment 1, information such as the remaining amount of air is converted to an electric signal by a pressure sensor (not shown) installed at the air tank 8 and inputted to the data input portion 12. The inputted electric signal is sent to the modulation portion 14. Information such as the remaining amount of air may be inputted at each prescribed time or may be inputted in the case where the amount is lower than the predetermined remaining amount.

The modulation portion 14 generates a modulation signal by performing prescribed modulation processing in accordance with the electric signal sent from the data input portion 12, sending the generated modulation signal to the transmitting portion 16. In Embodiment 1, a frequency modulation scheme in which a frequency (f1) of a modulation signal is approximately 50 KHz to 2 MHz and a frequency deviation is approximately 10 KHz to 20 KHz is applied. However, the frequency deviation and the modulation scheme are not limited to the above. The transmitting portion 16 amplifies a high-frequency signal including the modulation signal to a prescribed transmission power and sends the amplified high-frequency signal to the dividing portion 18.

The dividing portion 18 transmits the high-frequency signal to the antenna portion 22 and the piezoelectric element portion 24 by dividing the signal. The high-frequency signal sent to the antenna portion 22 is radiated as electromagnetic waves having the frequency f1, and the high-frequency signal sent to the piezoelectric element portion 24 is radiated as ultrasonic waves having the frequency f1 which is the same as the electromagnetic waves. As a result, the signal including the same information is transmitted by electromagnetic waves and ultrasonic waves as media in the same frequency in parallel. In Embodiment 1, the antenna portion 22 and the piezoelectric element portion 24 are both housed in a waterproof casing portion 20 which is waterproofed.

Next, the wireless receiving device 50 will be explained. The wireless receiving device 50 includes an antenna portion 54, a piezoelectric element portion 56, a combining portion 59, a receiving portion 60, a demodulation portion 62 and a data output portion 64.

The antenna portion 54 and the piezoelectric element portion 56 detect electromagnetic waves and ultrasonic waves, converting the detected electromagnetic waves and the ultrasonic waves to high-frequency signals respectively and sending them to the combining portion 59. The antenna portion 54 and the piezoelectric portion 56 are both housed in a waterproof casing portion (first casing) 52 which is waterproofed in the same manner as the wireless transmitting device 10. The combining portion 58 combines high-frequency signals sent from the antenna portion 54 and the piezoelectric element portion 56r sending the combined high-frequency signal to the receiving portion 60.

The receiving portion 60 extracts a modulation signal having the same frequency (f1) as electromagnetic waves and ultrasonic waves transmitted from the wireless transmitting device 10 from among the high-frequency signal sent from the combining portion 59, sending the extracted modulation signal to the demodulation portion 62. The demodulation portion 62 extracts an electric signal superimposed on the modulation signal by demodulating the modulation signal, sending the signal to the data output portion 64. The data output portion 64 may include a speaker, headphones or a vibrator (which are not shown) and may convert the electric signal sent from the demodulation portion 62 into voice or vibration to notify the diver 5. The data output portion 64 also may include a display panel (not shown) and may convert the electric signal sent from the demodulation portion 62 into a video signal to display.

Figure 3:
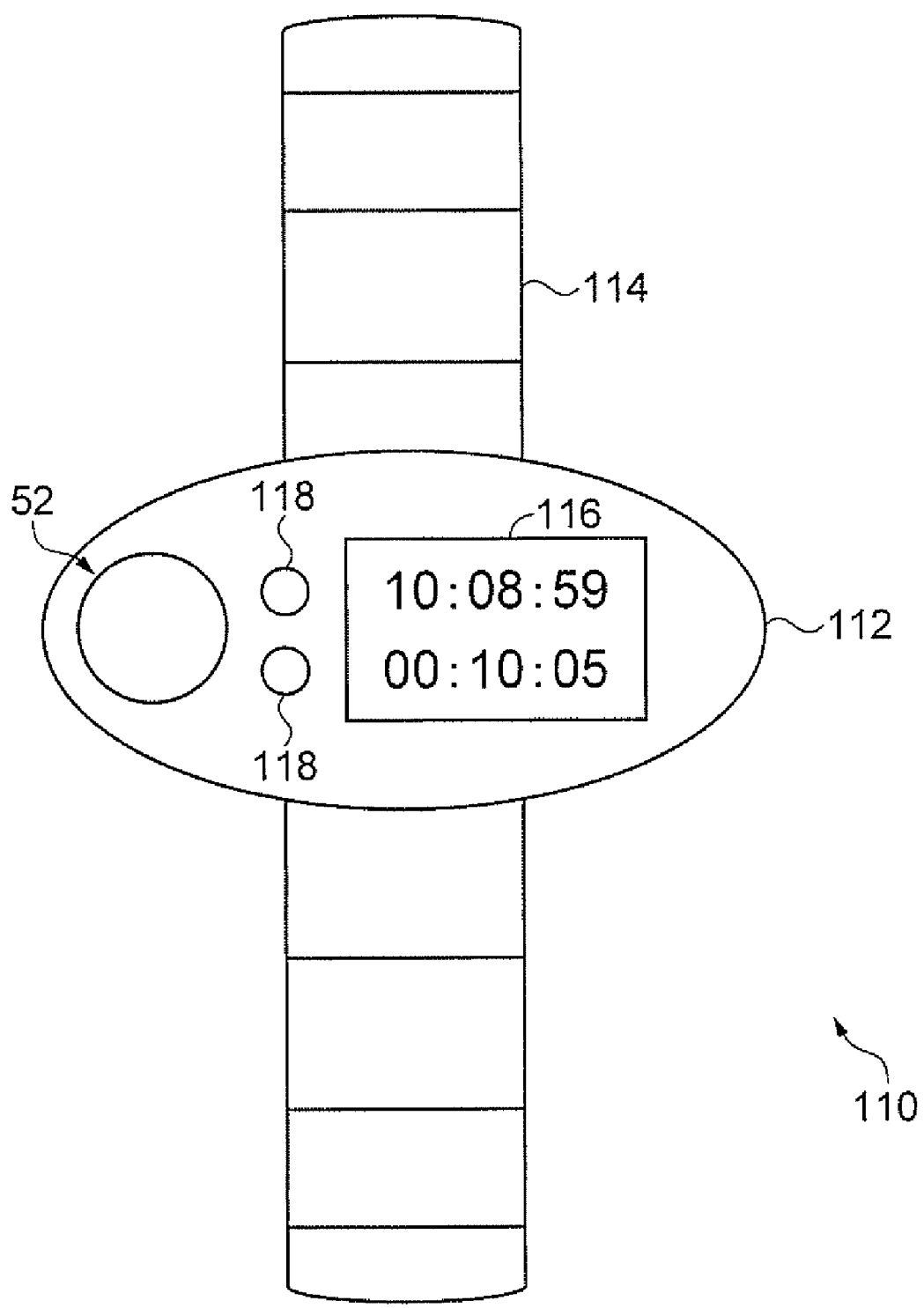
FIG. 3 is a view showing an appearance of an information processing apparatus for divers according to Embodiment 1.

FIG. 3 is a view showing an appearance of an information processing apparatus 110 for divers including the wireless receiving device 50. The information processing apparatus 110 is a computer for divers, including a casing portion 112 (second casing) which houses the wireless receiving device 50 and a belt portion 114 for fixing the casing portion 112 to an arm or other positions of the diver 5. On a surface of the casing portion 112, a display portion 116 displaying information such as current time, lapsed time and the remaining amount of air, operation buttons 118 used by the diver 5 who operates the information processing apparatus 110 and the waterproof casing portion 52 are arranged. In Embodiment 1, the casing portion 112 and the waterproof casing portion 52 are connected, however, a state in which they are separated is also preferable.

In the above wireless communication system 1, when the wireless transmitting device 10 and the wireless receiving device 50 are in water, communication is mainly performed by ultrasonic waves. When the wireless transmitting device 10 and the wireless receiving device 50 are on land or on water, communication is mainly performed by electromagnetic waves. Therefore, even in the case where the diver 5 frequently moves between on-water and in-water, the diver 5 can know information concerning the remaining amount of air of the air tank 8 on the back of himself/herself. Additionally, since the transmitting portion 16 of the wireless transmitting device 10 and the receiving portion 60 of the wireless receiving device 50 can be used in common, and a function of switching between communication by electromagnetic waves and communication by ultrasonic waves is not necessary, miniaturization, weight saving and cost reduction of the wireless transmitting device 10 and the wireless receiving device 50 can be realized.

Embodiment 2

Figure 4:
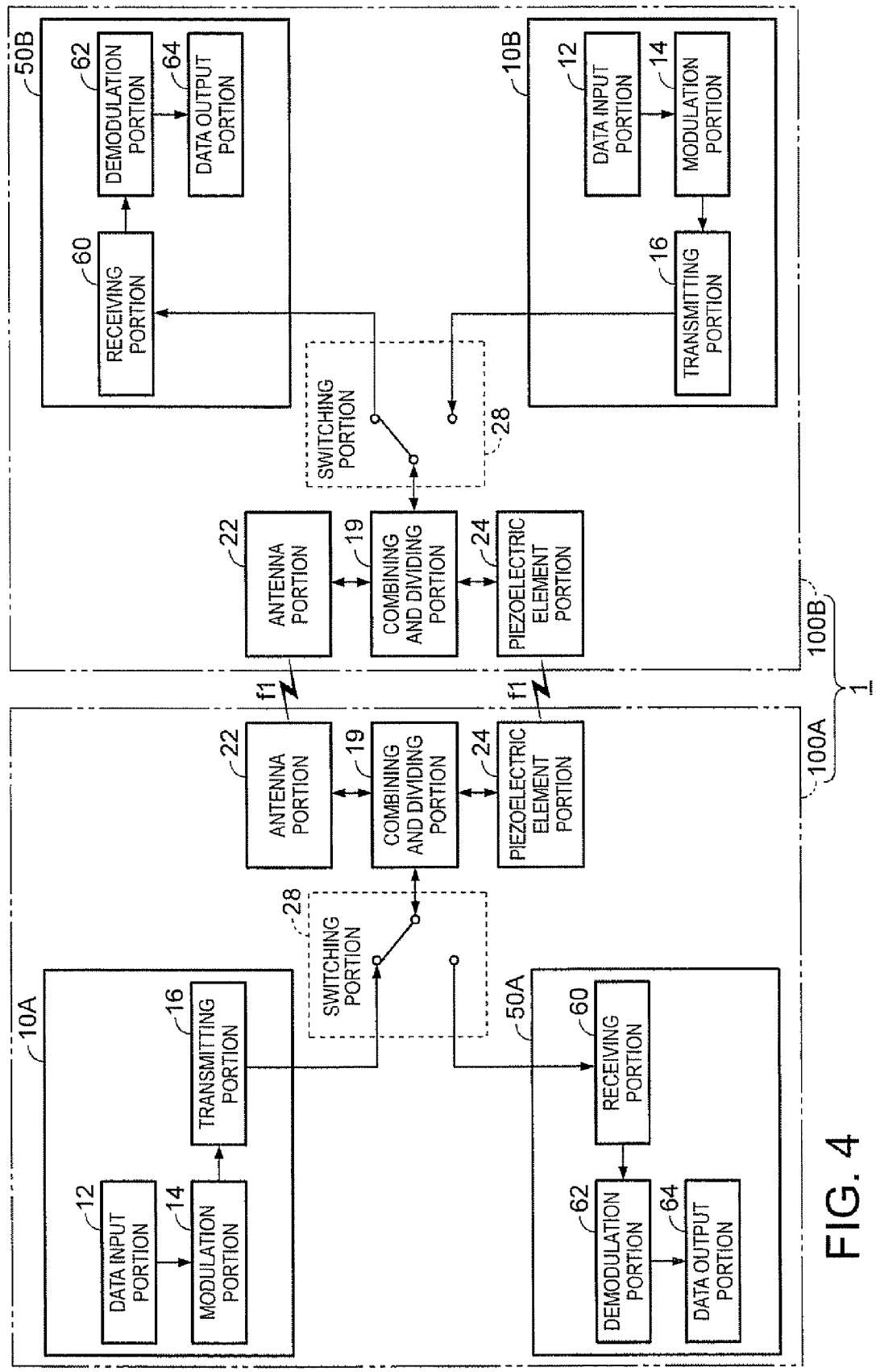
FIG. 4 is a diagram showing an application in which a wireless communication system according to Embodiment 2 is applied to transceivers.

Next, Embodiment 2 of the invention will be explained with reference to FIG. 4. FIG. 4 is a diagram showing an application in which a wireless communication system according to Embodiment 2 is applied to transceivers. In the following explanation, the identical numerals are given to portions which are the same as the already-explained portions without additional explanations thereof. In Embodiment 2, assume that transceivers 100A, 100B as the wireless communication system 1 include wireless transmitting units 10A, 10B and wireless receiving units 50A 50B respectively, which are capable of performing half-duplex communication. Since the transceivers 100A and 100B have the same configuration, the configuration of the transceiver 100A will be explained as a representative.

The transceiver 100A includes the wireless transmitting unit 10A, the wireless receiving unit 50A, a switching portion 28, a combining and dividing portion 19, the antenna portion 22 and the piezoelectric portion 24. The wireless transmitting unit 10A includes the data input portion 12, the modulation portion 14 and the transmitting portion 16 and the wireless receiving unit 50A includes the receiving portion 60, the demodulation portion 62 and the data output portion 64. In Embodiment 2, the data input portion 12 is a microphone (not shown) to which voice uttered by the diver 5 who holds the transceiver 100A is inputted. Therefore, voice uttered by the diver 5 is converted into an electrical signal and sent to the modulation portion 14. The switching portion 28 is a switch for switching between transmission and reception, which can be switched by operation by the diver 5, or may switch between transmission and reception automatically by detecting voice uttered by the diver 5. The combining and dividing portion 19 sends a high-frequency signal sent by the transmitting portion 16 to the antenna portion 22 and the piezoelectric element portion 24 respectively by dividing the signal, and combines high-frequency signals sent from the antenna portion 22 and the piezoelectric element portion 24 respectively. It is also preferable that the transceivers 100A, 100B have the form such as the information processing apparatus 110 for divers shown in FIG. 3.

In the above wireless communication system 1, when the transceivers 100A, 100B are in water, communication is mainly performed by ultrasonic waves. When the transceivers 100A, 100B are on land or on water, communication is mainly performed by electromagnetic waves. Therefore, even in the case in which two divers 5 hold the transceivers 100A, 100B respectively and move on land, on water, or in water, communication can be performed with each other. Additionally, since the wireless transmitting unit 10A and the wireless receiving unit 50A use the antenna portion 22 and the piezoelectric element portion 24 in common, miniaturization, weight saving and cost reduction of the transceivers 100A, 100B can be realized.

Embodiment 3

Figure 5:
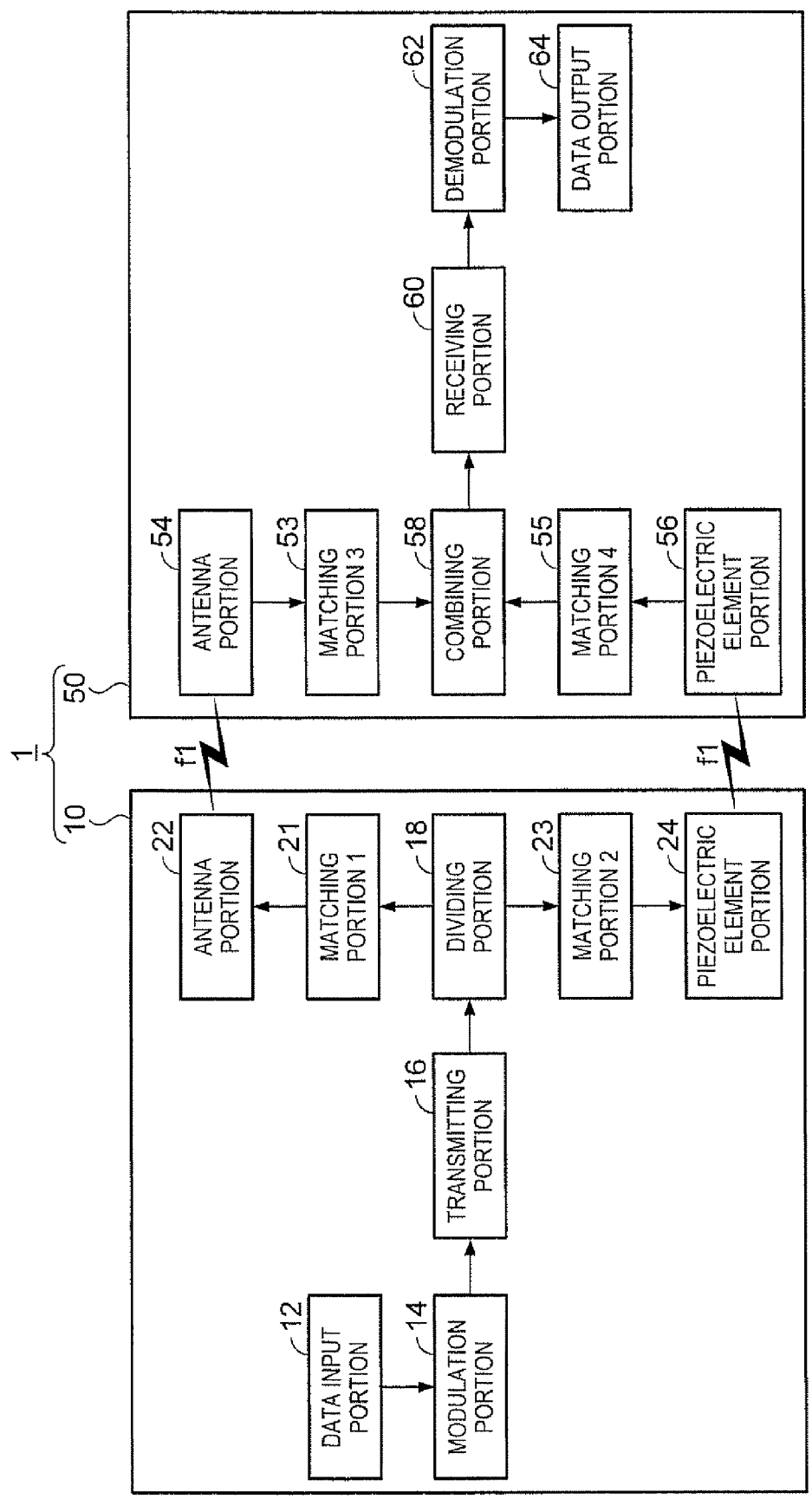
FIG. 5 is a block diagram showing a functional configuration of a wireless communication system according to Embodiment 3.

Next, Embodiment 3 of the invention will be explained with reference to FIG. 5. FIG. 5 is a block diagram showing a functional configuration of a wireless communication system according to Embodiment 3. In Embodiment 1, the high-frequency signal divided by the dividing portion 18 is inputted in the antenna portion 22 and the piezoelectric element portion 24 in the wireless transmitting device 10. Also, the high-frequency signals outputted from the antenna portion 54 and the piezoelectric element portion 56 are outputted to the combining portion 58. In Embodiment 3, a matching portion 1 (21) is provided between the dividing portion 18 and the antenna portion 22, and a matching portion 2 (23) is provided between the dividing portion 18 and the piezoelectric element portion 24 in the wireless transmitting device 10. Additionally, a matching portion 3 (53) is provided between the combining portion 58 and the antenna portion 54, and a matching portion 4 (55) is provided between the combining portion 58 and the piezoelectric element portion 56 in the wireless receiving device 50. The matching portion 1 (21) to the matching portion 4 (55) are capable of not only matching impedances at transmitting portion 16, the antenna portion 22 and the piezoelectric element portion 24 but also improving isolation between the antenna portions (22, 54) and the piezoelectric element portions (24, 56). Furthermore, the same effects as Embodiment 1 can be obtained. In Embodiment 3, the matching portion 1 (21) to the matching portion 4 (55) are provided, however, it is also preferable that the matching portion is provided only at one of the antenna portion (22, 54) and the piezoelectric element portion (24, 56), and preferable that the matching portion is provided only at one of the wireless transmitting device 10 and the wireless receiving device 50.

Embodiment 4

Figure 6:
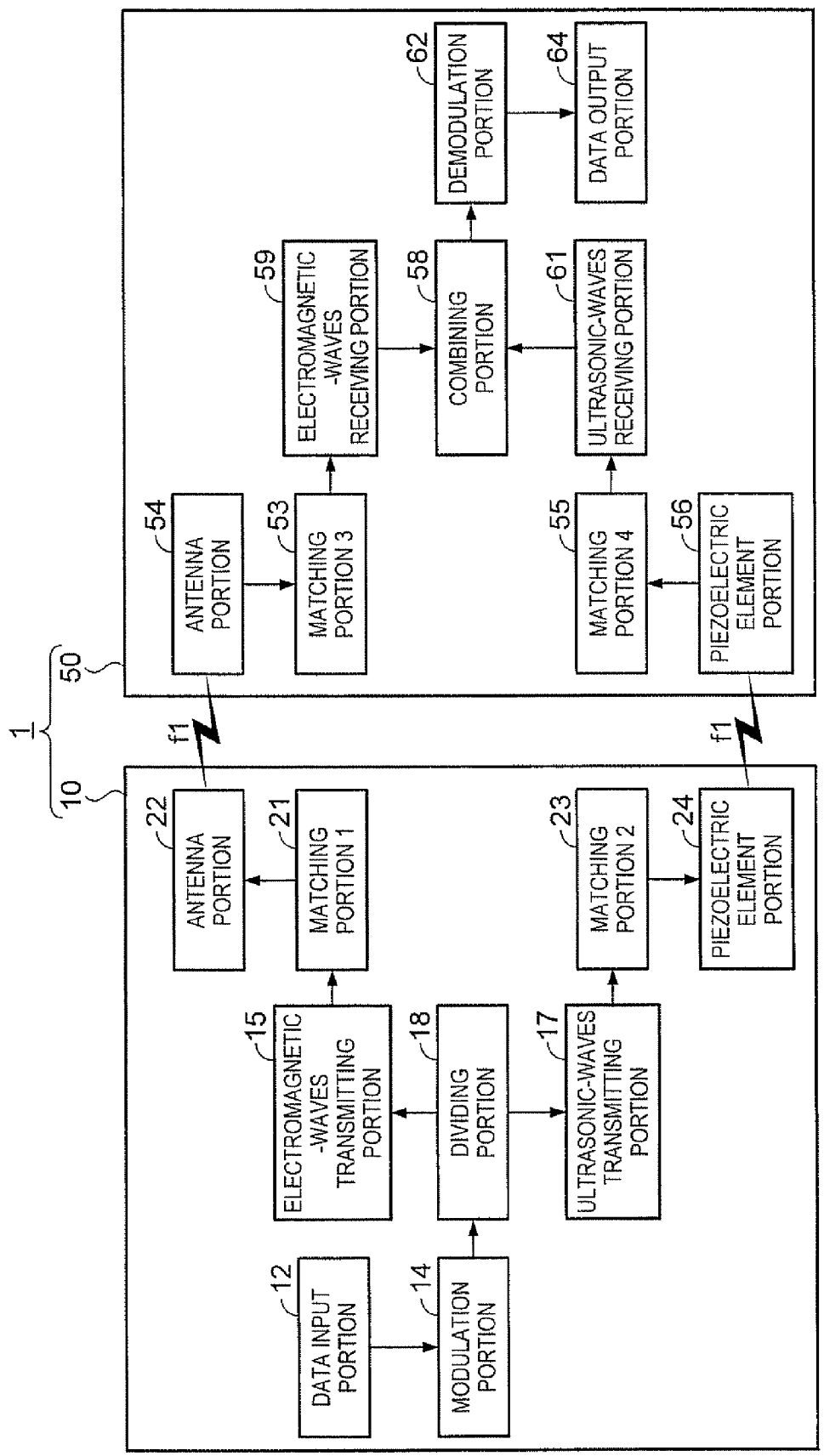
FIG. 6 is a block diagram showing a functional configuration of a wireless communication system according to Embodiment 4.

Next, Embodiment 4 of the invention will be explained with reference to FIG. 6. FIG. 6 is a block diagram showing a functional configuration of a wireless communication system according to Embodiment 4. In Embodiment 1 to Embodiment 3, the transmitting portion 16 and the receiving portion 60 are used in common with respect to electromagnetic waves and ultrasonic waves. In Embodiment 4, the wireless transmitting device 10 includes an electromagnetic-waves transmitting portion 15 and an ultrasonic-waves transmitting portion 17, and the wireless receiving device 50 includes an electromagnetic-waves receiving portion 59 and an ultrasonic-waves receiving portion 61, thereby transmitting and receiving electromagnetic waves and ultrasonic waves separately. According to the configuration, in addition to the same effects as Embodiment 1, the level of a transmission signal can be set separately with respect to electromagnetic waves and ultrasonic waves. Furthermore, the amplification gain of a receiving signal can be suitably set with respect to electromagnetic waves and ultrasonic waves separately.

Embodiments of the invention have been explained with reference to the drawings, and specific configurations are not limited to the above Embodiments and design change and the like in a range not departing from the gist of the invention are included.

What is claimed is:

1. A wireless communication system comprising:
   a transmitting device; and
   a receiving device, and
   wherein the transmitting device includes
   an input portion generating an input signal based on information to be inputted,
   a modulation portion generating a modulation signal by performing a prescribed modulation to the input signal,
   a transmitting portion generating a high-frequency signal having a prescribed frequency by amplifying the modulation signal,
   a dividing portion dividing the high-frequency signal into a first signal and a second signal,
   an antenna portion converting the first divided high-frequency signals into electromagnetic waves having the prescribed frequency and radiating the electromagnetic waves and
   a piezoelectric element portion converting the second divided high-frequency signals into ultrasonic waves having the prescribed frequency and radiating the ultrasonic waves,
   wherein the receiving device includes
   an antenna portion receiving electromagnetic waves having the prescribed frequency and converting the waves into a high-frequency signal 1,
   a piezoelectric element portion receiving ultrasonic waves having the prescribed frequency and converting the waves into a high-frequency signal 2,
   a combining portion combining the high-frequency signal 1 with the high-frequency signal 2 to generate a combined signal,
   a receiving portion extracting a modulation signal from the combined signal,
   a demodulation portion demodulating the extracted modulation signal to acquire the input signal, and
   an output portion outputting the information included in the acquired input signal.

2. The wireless communication system according to claim 1,
   a matching portion which matches impedances is provided at least one of between the dividing portion and the antenna portion, between the dividing portion and the piezoelectric element portion, between the combining portion and the antenna portion and between the combining portion and the piezoelectric element portion.

3. The wireless communication system according to claim 1, wherein the antenna portion and the piezoelectric element portion in the transmitting device, or the antenna portion and the piezoelectric element portion in the receiving device, or both, are housed in a first casing which is waterproofed.

4. The wireless communication system according to claim 3,
   wherein the first casing is connected to a second casing which houses at least one of the transmitting device and the receiving device.

5. A transmitting device comprising:
   an input portion generating an input signal based on information to be inputted;
   a modulation portion generating a modulation signal by performing a prescribed modulation to the input signal,
   a dividing portion dividing the modulation signal into a first signal and a second signal;
   an electromagnetic-waves transmitting portion generating a high-frequency signal 1 by amplifying the first divided modulation signals;
   an ultrasonic-waves transmitting portion generating a high-frequency signal 2 by amplifying the second divided modulation signal;
   an antenna portion converting the high-frequency signal 1 into electromagnetic waves having a prescribed frequency and radiating the electromagnetic waves; and
   a piezoelectric element portion converting the high-frequency signal 2 into ultrasonic waves having the prescribed frequency and radiating the ultrasonic waves.

6. A receiving device comprising:
   an antenna portion receiving electromagnetic waves of electromagnetic waves and ultrasonic waves transmitted by the same frequency, which have been obtained by modulating an input signal generated based on information to be inputted, and converting the electromagnetic waves into a high-frequency signal 1;
   a piezoelectric element portion receiving the ultrasonic waves and converting the waves into a high-frequency signal 2;
   an electromagnetic-waves receiving portion extracting a modulation signal 1 from the high-frequency signal 1;
   an ultrasonic-waves receiving portion extracting a modulation signal 2 from the high-frequency signal 2;
   a combining portion combining the modulation signal 1 with the modulation signal 2 to generate a combined modulation signal;
   a demodulation portion demodulating the combined modulation signal to acquire the input signal; and
   an output portion outputting information included in the acquired input signal.

7. An information processing apparatus carried at the time of diving, comprising:
   At least one of:
   1) the transmitting device, that includes:
      an input portion generating an input signal based on information to be inputted,
      a modulation portion generating a modulation signal by performing a prescribed modulation to the input signal,
      a transmitting portion generating a high-frequency signal having a prescribed frequency by amplifying the modulation signal,
      a dividing portion dividing the high-frequency signal into a first signal and a second signal,
      an antenna portion converting the first divided high-frequency signals into electromagnetic waves having the prescribed frequency and radiating the electromagnetic waves, and
      a piezoelectric element portion converting the second divided high-frequency signals into ultrasonic waves having the prescribed frequency and radiating the ultrasonic waves, and 2) the receiving device, that includes:
- an antenna portion receiving electromagnetic waves having the prescribed frequency and converting the waves into a high-frequency signal 1,
- a piezoelectric element portion receiving ultrasonic waves having the prescribed frequency and converting the waves into a high-frequency signal 2,
- a combining portion combining the high-frequency signal 1 with the high-frequency signal 2 to generate a combined signal,
- a receiving portion extracting a modulation signal from the combined signal,
- a demodulation portion demodulating the extracted modulation signal to acquire the input signal, and
- an output portion outputting the information included in the acquired input signal.

* * * * *